Dec. 2, 1958 K. L. FLAATTEN 2,862,290
PISTON RING REMOVER
Filed Feb. 17, 1956 2 Sheets-Sheet 1

INVENTOR.
KJELL L. FLAATTEN,
BY
McMorrow, Berman + Davidson
ATTORNEYS.

Dec. 2, 1958  K. L. FLAATTEN  2,862,290
PISTON RING REMOVER
Filed Feb. 17, 1956  2 Sheets-Sheet 2
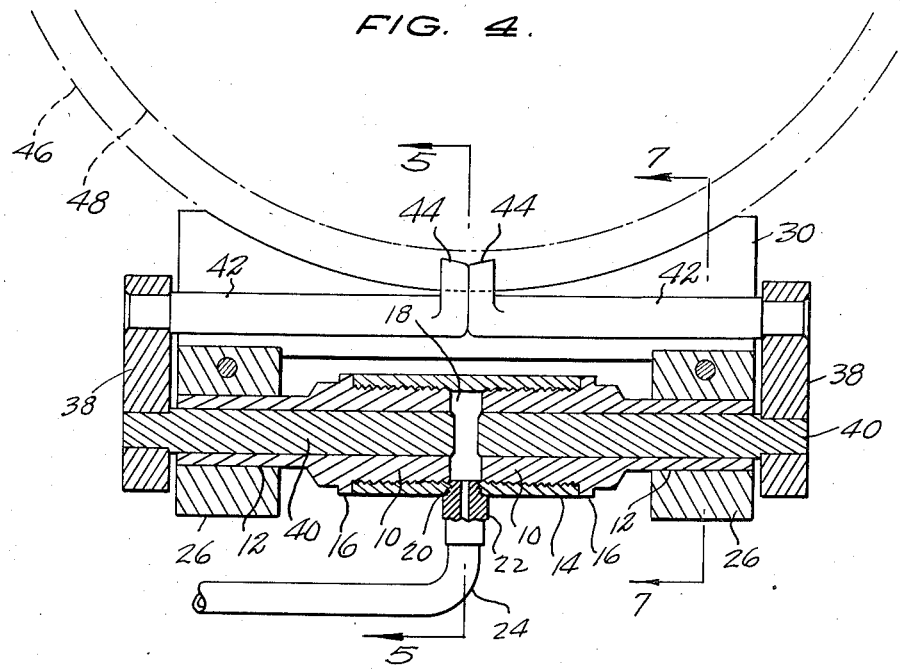
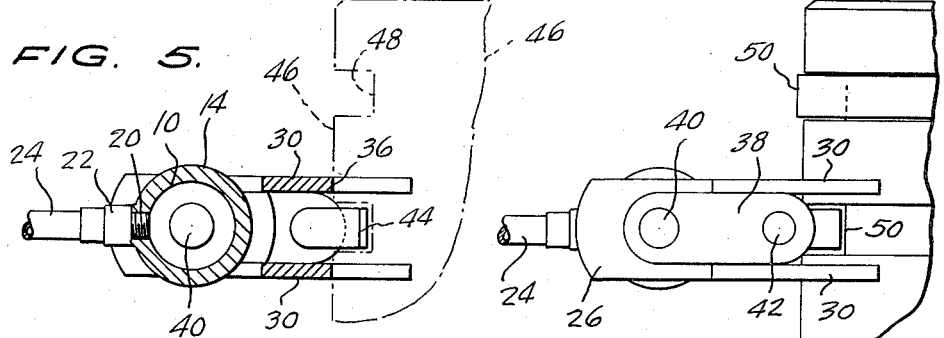
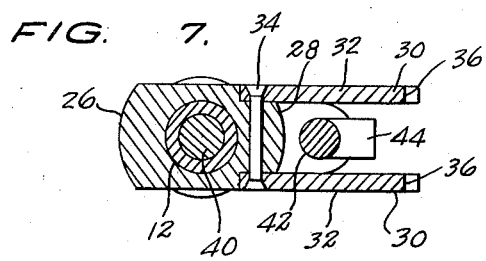
INVENTOR.
KJELL L. FLAATTEN,
BY
McMorrow, Berman + Davidson
ATTORNEYS.

United States Patent Office 2,862,290
Patented Dec. 2, 1958

2,862,290
PISTON RING REMOVER
Kjell Lofstad Flaatten, San Pedro, Calif.
Application February 17, 1956, Serial No. 566,239
2 Claims. (Cl. 29—222)

The present invention relates to that class of devices known as piston rings removers or expanders, used for the purpose of extracting a piston ring from its associated piston groove, for replacement or repair of said ring.

Considerable difficulty is experienced in the removal of piston rings. It is of importance that the piston rings be removed in such a manner as not to be expanded any more than is absolutely necessary to disengage the same fully from its associated ring groove. Still further, it is important that the piston ring be held in its expanded condition when being withdrawn from the piston, without contact with the piston, thus to prevent scoring of the piston surface.

Heretofore, it has been proposed to provide piston ring removers, and the present invention is not intended to incorporate, within its broadest aspects, a device for radially expanding a piston ring to remove the same from its associated groove. Rather, the invention is intended to encompass an improved device of this type, that will be particularly adapted for the removal of rings of large size, applied to large diameter pistons, such as those on marine engines installed in seagoing vessels. The invention can, however, be used for the removal of smaller rings, without departure from the principles of the invention.

One important object is to provide a device of the nature referred to which will be designed to be operated by air or hydraulic pressure, for the purpose of overcoming the strong resiliency of the piston ring to radially expand the same.

Another object of importance is to provide a device of the nature referred to wherein the movement of the parts of the device that expand the ring can be controlled with a high degree of accuracy, responsive to the application of a predetermined, correspondingly accurately controlled amount of air or hydraulic pressure.

Still another object is to provide means of the type stated that will be so designed as to include a seat receiving the associated piston, with the arrangement being such that when the piston is engaged in said seat, the ring-expanding portions of the device will be accurately positioned for movement in a line tangential to the ring when, subsequently, the air or hydraulic pressure is applied.

Other objects will appear from the following description, the claims appended thereto, and from the annexed drawing, in which like reference characters designate like parts throughout the several views, and wherein:

Figure 4 is an enlarged sectional view on line 4—4 of Figure 2, the device being retracted and a piston and piston ring being shown fragmentarily and in dotted lines;

Figure 5 is a transverse sectional view on the same scale as Figure 4, taken on line 5—5 of Figure 4;

Figure 6 is an end elevational view of the device in which the piston has been shown fragmentarily, as seen from the right of Figure 4; and Figure 7 is a sectional view, on the same scale as Figure 4, taken on line 7—7 of Figure 4.

Figure 1:
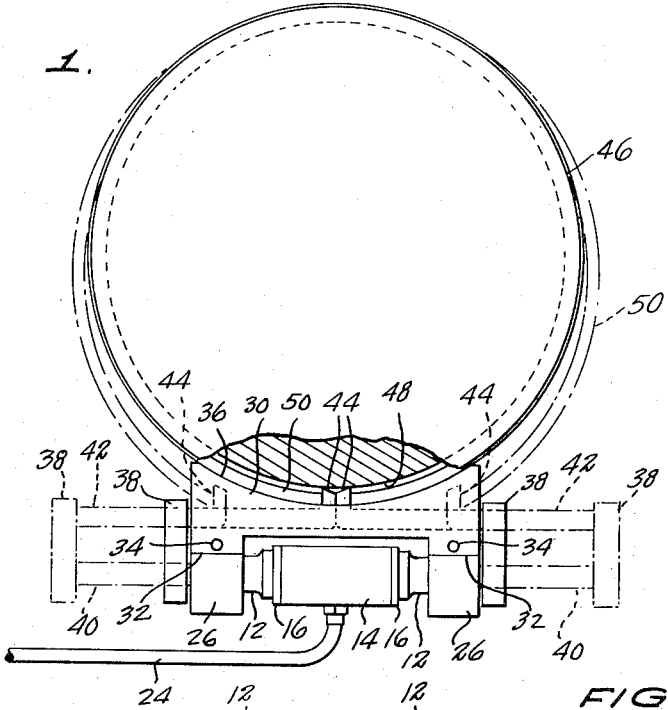
Figure 1 is a front elevational view of the device in use during the expansion of a ring from a piston, the ring and device being shown in full lines in the position thereof prior to expansion of the ring, and being shown in dotted lines in the position assumed when the ring has been expanded.

Referring to the drawings in detail, the reference numeral 10 has been applied to opposed identical but opposite bushings or liners of cylindrical formation, integral at their outer ends with externally reduced axial extensions 12. The inner end portions of the liners are externally threaded, for engagement in complementary threads formed in the opposite ends of a cylinder 14, and formed upon the liners, intermediate opposite ends thereof, are circumferential collars 16 abutting against the opposite ends of the cylinder 14 to limit movement of the liners inwardly of the cylinder. Gaskets can be employed, between the cylinder ends and the collars 16, to insure to the maximum extent against leakage of the air or other pressure fluid forced into the cylinder.

The liners at their inner ends are spaced apart to define a pressure chamber 18 within the cylinder, and communicating with said pressure chamber is a threaded opening 20 of the cylinder receiving a complementarily threaded fitting 22 provided upon the end of a hose 24 through which the pressure fluid, such as air, oil, or the like is directed.

Receiving and fixedly engaged with the axial extension 12 are sleeves 26, said sleeves having projections 28. In face to face contact with the opposite sides of the projections are cylinder support plates 30, 30 disposed in parallel planes, the axis of the cylinder being parallel to and being disposed medially between the planes of said plates. The plates, at their opposite ends, have lateral extensions 32, these being the portions of the plates bearing against the opposite sides of the projections 28. Fixedly securing the portions 32 to the projections 28 are pins 34 (Figure 7).

Formed in the outer longitudinal edges of the plates 30 are arcuate recesses 36, adapted to provide seats for a piston the piston ring of which is to be removed.

Beyond the opposite ends of the plates 30 there are provided connecting members 38, lying in planes normal to the axis of the cylinder as shown in Figure 4, said connecting members being of oblong outer configuration in the illustrated embodiment as shown in Figure 6.

The connecting members at one end have openings in which are press-fitted reduced extensions formed on the outer ends of pistons 40, working in the bores of the bushings or liners and terminating at their inner ends, in the normal retracted position of the pistons, substantially in the planes of opposite walls of the chamber 18 (see Figure 4).

In the outer ends of the connecting portions 38 there are fixedly engaged reduced extensions formed upon the outer ends of ring-expanding rods or bars 42, and on the inner ends of said bars there are formed lateral extensions 44 providing hooks adapted to bear against the opposite ends of the piston ring to be removed. The rods extend in parallel relation to the pistons, and are shiftable between retracted positions shown in Figure 4 and extended positions shown in dotted lines in Figures 1 and 2. The hooks 44, in the retracted positions of the rods, are in face-to-face contact as shown in Figure 4, and said hooks have beveled outer end surfaces, facilitating the extension thereof between the piston rings, and providing a maximum bearing surface between the hooks and rings during the expansion of the rings.

A conventional piston has been designated at 46, and includes one or more spaced circumferentially extending ring grooves 48 in which are engaged piston rings 50.

Figure 2:
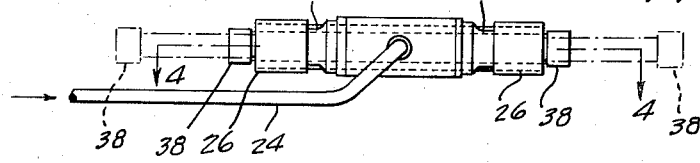
Figure 2 is a bottom plan view of the device, shown in full lines in its normal, retracted position and in dotted lines in its extended position.
Figure 3:
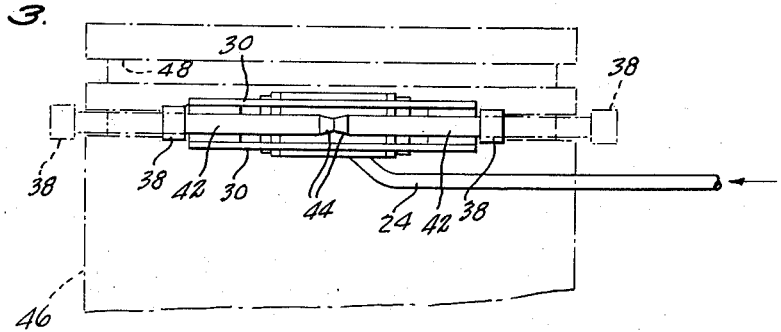
Figure 3 is a top plan view of the device, the piston being shown in dotted lines and the dotted lines also being used to show the extended position of the device.

In use of the device, the hooks 44 are extended into the space between the ends of the piston rings, as shown in Figure 1. Then, pressure is supplied through the hose 24, tending to force the coaxial pistons 40 outwardly of the cylinder, to the dotted line positions of Figures 1 and 2. This effects corresponding movement of the bars 42 away from one another, thus spreading the hooks 44 and, in turn, spreading the piston ring 50 to the dotted line position in Figure 1, so that the ring can be removed.

When the ring has been expanded to the proper extent, the pressure can be maintained during extraction of the ring from the piston, and as will be seen there is no necessity of the expansion of the ring being maintained by manual effort on the part of the worker.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A piston ring remover comprising an elongated, straight cylinder means having a connection to a source of pressure fluid; a pair of identical, transversely spaced plates rigidly connected to the cylinder means in position extending longitudinally of the cylinder means alongside the same, said plates having outer longitudinal edges arcuately, longitudinally indented for the major part of their lengths, said edges being laterally spaced from the cylinder means a distance increasing progressively in opposite directions from a location medially between the ends of said edges toward said ends of the edges; coaxial pistons working in and projecting out of the respective, opposite ends of the cylinder means; coaxial, straight rods disposed between the plates and paralleling the pistons, said rods having connections to the pistons, for straight line movement of the rods toward and away from each other into and out of end-abutting positions responsive to corresponding movement of the pistons; and hooks extending laterally from the rods and contacting each other in the end-abutting positions of the rods to extend between and engage the ends of a piston ring to be removed, said hooks having straight line movement away from each other on shifting of the rods out of their end-abutting positions to spread said ring, the hooks projecting from the rods a distance greater than the distance of said edges from the cylinder means measured at said location but less than the distance of said edges of the cylinder means measured at the ends of said edges, for movement of the hooks into and out of the space between the plates responsive to movement of the rods into and out of, respectively, their end-abutting positions.

2. A piston ring remover comprising: an elongated, straight cylinder means including a cylinder having medially between its ends a connection to a source of pressure fluid, elongated liners secured within opposite ends of the cylinder and projecting beyond said ends of the cylinder in coaxial alignment, said liners having end to end axial bores, and sleeves extending about and fixedly secured to the projecting ends of the respective liners; a pair of identical, transversely spaced plates having outer ends rigidly connected to the respective sleeves, said plates extending longitudinally of the cylinder and liners alongside the same, said plates having outer longitudinal edges arcuately, longitudinally indented for the major part of their lengths, said edges being laterally spaced from the cylinder means a distance increasing progressively in opposite directions from a location medially between the ends of said edges toward said ends of the edges; coaxial pistons working in said bores and projecting out of the bores beyond said sleeves; connecting members secured to the projection ends of the pistons and extending laterally therefrom at locations beyond said ends of the plates; coaxial, straight rods disposed between the plates and having outer ends fixedly secured to said connecting members, said rods extending in parallel relation to the pistons, for straight line movement of the rods toward and away from each other into and out of, respectively, end-abutting positions responsive to corresponding movement of the pistons; and hooks rigid with and extending laterally from the other ends of the rods and contacting in the end-abutting positions of the rods to extend between and engage the ends of a piston ring to be removed, said hooks having straight line movement with the rods away from each other on shifting of the rods out of end-abutting position, thus to spread said ring, the hooks projecting from the rods a distance greater than the distance of said edges from the axis of the cylinder means at said location, but less than the distance of the ends of said edges from the cylinder means, for movement of the hooks into and out of the space between the plates responsive to movement of the rods into and out of, respectively, their end-abutting positions.

References Cited in the file of this patent

UNITED STATES PATENTS

| 1,119,374 | Stirk | Dec. 1, 1914 |
| 1,337,600 | Hammontree et al. | Apr. 20, 1920 |
| 1,764,146 | Bramberry | June 17, 1930 |
| 2,153,941 | Smith | Apr. 11, 1939 |
| 2,693,633 | Wood | Nov. 9, 1954 |